United States Patent [19]
Bock et al.

[11] Patent Number: 4,548,735
[45] Date of Patent: Oct. 22, 1985

[54] VISCOSITY ENHANCEMENT OF BLOCK POLYMER SOLUTIONS WITH OIL

[75] Inventors: Jan Bock, Bridgewater; Paul L. Valint, Jr., Asbury, both of N.J.

[73] Assignee: Exxon Research and Engineering Co., Florham Park, N.J.

[21] Appl. No.: 454,241

[22] Filed: Dec. 29, 1982

[51] Int. Cl.$^4$ .............................................. B01J 13/00
[52] U.S. Cl. .................................... 252/312; 525/344; 524/474; 524/481; 524/485
[58] Field of Search ............. 252/312; 525/344, 333.5, 525/; 524/547, 474, 481, 485, 482

[56] References Cited
U.S. PATENT DOCUMENTS

| | | | |
|---|---|---|---|
| 2,612,485 | 9/1952 | Baer et al. | 525/333.5 |
| 2,638,445 | 5/1953 | Young et al. | 525/333.5 |
| 3,875,125 | 4/1975 | Whitehurst | 525/333.5 |
| 4,076,699 | 2/1978 | Grimaud et al. | 525/333.5 |
| 4,127,500 | 11/1978 | Suzuki et al. | 525/333.5 |
| 4,321,340 | 3/1980 | Klein et al. | 525/344 |

*Primary Examiner*—Josephine L. Barr
*Attorney, Agent, or Firm*—Richard E. Nanfeldt

[57] ABSTRACT

The present invention relates to oil solubilization agents for solubilizing oil into an aqueous solution in which the oil solubilization agents are diblock polymers of t-butylstyrene/metal styrene sulfonate and triblock polymers of t-butylstyrene/metal styrene sulfonate/t-butylstyrene.

3 Claims, 6 Drawing Figures

FIG. 1 t-BUTYLSTYRENE-STYRENE DIBLOCK POLYMER SYNTHESIS

FIG. 2

FIG. 3
SULFONATION OF t-BUTYLSTYRENE-STYRENE BLOCK POLYMERS

VISCOSITY ENHANCEMENT OF BLOCK POLYMER SOLUTIONS WITH OIL

FIELD OF THE INVENTION

The present invention relates to oil solubilization agents for solubilizing oil into an aqueous solution in which the oil solubilization agents are diblock polymers of t-butylstyrene/metal styrene sulfonate and triblock polymers of t-butylstyrene/metal styrene sulfonate/t-butylstyrene.

BACKGROUND OF THE INVENTION

The present invention describes a process for the solubilization of a hydrocarbon liquid into an aqueous solution of a sulfonated diblock polymer of t-butylstyrene/metal styrene sulfonate or a triblock polymer of t-butylstyrene/metal styrene sulfonate/t-butylstyrene, wherein the incorporation of the hydrocarbon liquid causes an increase in the viscosity of the aqueous liquid.

Water soluble diblock polymers of t-butylstyrene/metal styrene sulfonate or triblock polymers of t-butylstyrene/metal styrene sulfonate/t-butylstyrene of relatively low molecular weight, have been found to efficiently viscosify water. These polymers have a water soluble block and a hydrocarbon soluble block. For aqueous solubility, the water soluble block is greater than 80 weight percent of the total polymer. One method of preparing the block polymers is to anionically polymerize a hydrocarbon soluble block polymer. This is followed by the selective functionalization of the major block to render said block water soluble. The functionalization in this invention is sulfonation of the resulting sulfonic acid. These block polymers readily dissolve in water. The resulting solutions exhibit enhanced viscosity at low concentrations (i.e., 500 to 1500 ppm) relative to solutions of homopolymers of even higher molecular weight. They also have viscosity levels significantly greater than corresponding random copolymer solutions of similar compositions.

Numerous U.S. Patents have taught methods of sulfonating a variety of elastomeric and thermoplastic polymers. These U.S. Patents are: U.S. Pat. Nos. 3,642,728; 3,836,511; 3,072,618; 3,072,619; 3,847,854; 3,870,841 and 3,877,530. However, none of these references teach the process for preparing the sulfonated diblock and triblock polymers of the instant invention, nor do they recognize that sulfonated polymers of this class are excellent oil solubilization agents for aqueous solutions, wherein the incorporation of the oil causes an increase in the viscosity of the aqueous solution.

SUMMARY OF THE INVENTION

The present invention relates to a process for the formation of oil solubilization agents which are water soluble diblock polymers of t-butylstyrene/metal styrene sulfonate or triblock polymers of t-butylstyrene/metal styrene sulfonate/t-butylstyrene, wherein these diblock or triblock polymers are formed by an anionic polymerization process and the formed diblock or triblock polymer is selectively sulfonated on the styrene block. The diblock polymers of t-butylstyrene/metal styrene sulfonate or the triblock polymers of t-butylstyrene/metal styrene sulfonate/t-butylstyrene are excellent oil solubilization agents for incorporating an oil into an aqueous solution, wherein the incorporation of the oil causes an increase in the viscosity of the aqueous solution.

GENERAL DESCRIPTION OF THE INVENTION

Figure 1:
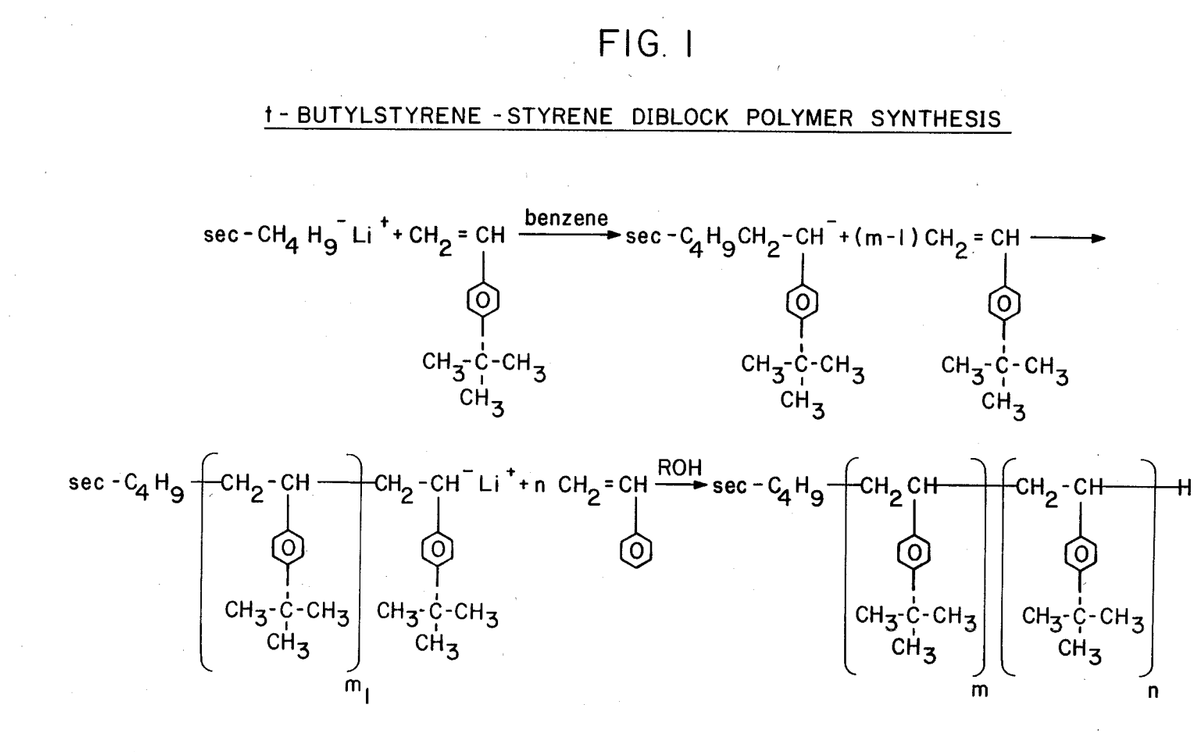
FIG. 1 illustrates a scheme of the preparation of a diblock polymer of t-butylstyrene/styrene.

The water soluble diblock polymers of t-butylstyrene/metal styrene sulfonate and triblock polymers of t-butylstyrene/metal styrene sulfonate/t-butylstyrene are formed by the selective sulfonation of the styrene block of the diblock polymer of t-butylstyrene/styrene or the triblock polymer of t-butylstyrene/styrene/t-butylstyrene. These diblock or triblock polymers are formed by the anionic polymerization of styrene monomer and t-butylstyrene. The process of forming the diblock copolymers of t-butylstyrene/styrene and the triblock polymers of t-butylstyrene/styrene/t-butylstyrene comprises the steps based on a synthetic reaction sequence to form the block polymers of t-butylstyrene-b-styrene sulfonate by means of styrene monomer to continue polymerization on the living anion polymer. All polymerizations were initiated with sec-butyl lithium to form the t-butylstyrene anion. Additional t-butylstyrene was added for the desired chain length of that block followed by the addition of styrene only for diblock polymer preparation. Chain termination was accomplished by the addition of an alcohol to the reaction mixture to protonate the chain and anionic functionality. The overall reaction sequence for the diblock polymer synthesis is illustrated in FIG. 1.

Figure 2:
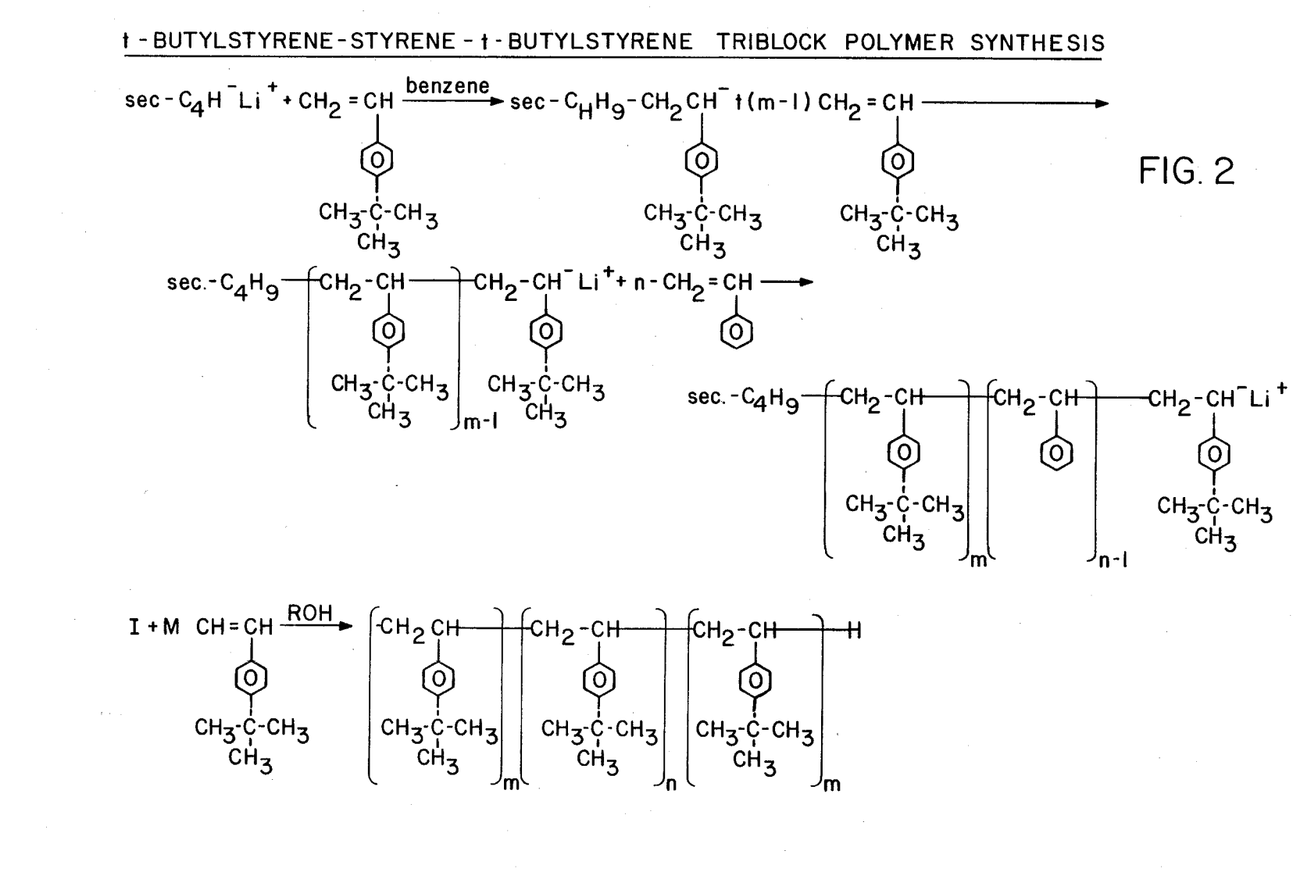
FIG. 2 illustrates a scheme of the preparation of the triblock polymer of t-butylstyrene/styrene/t-butylstyrene.

The preparation of triblock polymer with end blocks of t-butylstyrene was done sequentially, again, starting with initiation of t-butylstyrene polymerization by sec-butyl lithium. After addition of styrene to form the midblock, t-butylstyrene monomer was again added to the living polymer chain to complete the triblock polymer synthesis as schematically presented in FIG. 2.

The polymerization process for preparing the diblock polymers of t-butylstyrene/styrene comprises the steps of forming a t-butylstyrene anion by initiation of t-butylstyrene monomer with sec-butyl lithium; adding additional t-butylstyrene to t-butylstyrene anion to obtain the desired chain length of the t-butylstyrene block; adding styrene to the living anion polymer of t-butylstyrene until the desired chain length of the styrene block has been achieved; and terminating the polymerization by the addition of alcohol.

The polymerization process for preparing the triblock polymers of t-butylstyrene/styrene/t-butylstyrene comprises the additional steps of adding additional t-butylstyrene to the living anion of the t-butylstyrene/styrene polymer prior to chain termination by an alcohol.

The diblock polymers of t-butylstyrene/styrene are represented by the formula:

wherein m is about 0.5 to about 15.0 mole %, more preferably about 1.0 to about 12.0 mole %, and most preferably about 2.0 to about 12.0 mole %; and n is about 85.0 to about 99.5 mole %, more preferably about 88.0 to about 99.0 mole %, and most preferably about 88.0 to about 98.0 mole %. The molecular weight, as determined by gel permeation chromatography, for these diblock polymers of t-butylstyrene/styrene is about 100,000 to about 3,000,000, more preferably about 200,000 to about 2,000,000 and most preferably about 400,000 to about 1,000,000.

The triblock polymers of t-butylstyrene/styrene/t-butylstyrene are represented by the formula:

wherein m is about 0.25 to about 7.5 mole %, more preferably about 0.5 to about 6.0 mole %, and most preferably about 1.0 to about 6.0 mole %; and n is about 85.0 to about 99.5 mole %, more preferably about 88.0 to about 99.0 mole %, and most preferably about 88.0 to about 98.0 mole %. The molecular weight, as determined by gel permeation chromotography, for these triblock polymers of t-butylstyrene/styrene/t-butylstyrene is about 100,000 to about 3,000,000, more preferably about 200,000 to about 2,000,000, and most preferably about 400,000 to about 1,000,000.

Figure 3:
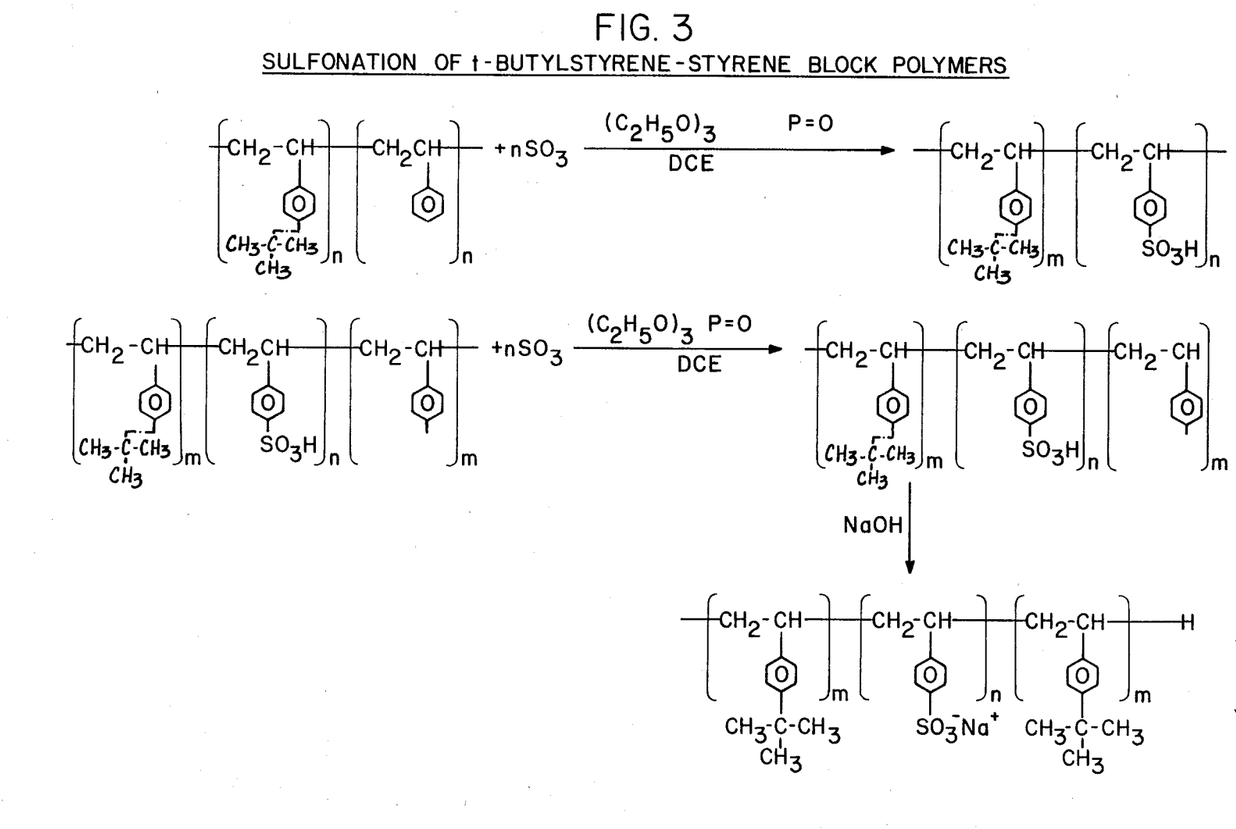
FIG. 3 illustrates a scheme of the preparation of a diblock polymer of t-butylstyrene/metal styrene sulfonate and a triblock polymer of t-butylstyrene/metal styrene sulfonate/t-butylstyrene.

The diblock polymers of t-butylstyrene/styrene or the triblock polymers of t-butylstyrene/styrene/t-butylstyrene are sulfonated according to schematic sequence, as illustrated in FIG. 3.

In carrying out the invention, the diblock or triblock polymer is dissolved in a non-reactive solvent such as a chlorinated aliphatic hydrocarbon or chlorinated aromatic hydrocarbon such as dichloroethane. A sulfonating agent is added to the solution of the polymer and non-reactive solvent at a temperature of about $-100°$ C. to about 100° C. for a period of time of about 1 to about 60 minutes, most preferably at room temperature for about 5 to about 45 minutes; and most preferably about 15 to about 30. Typical sulfonating agents are described in U.S. Pat. No. 3,642,728, incorporated herein by reference. These sulfonating agents are a complex of a sulfur trioxide donor and a Lewis base containing oxygen, sulfur, or phosphorus. Typical sulfur trioxide donors are $SO_3$, chlorosulfonic acid, fluorosulfonic acid, sulfuric acid, oleum, etc. Typical Lewis bases are dioxane, tetrahydrofuran, tetrahydrothiophene, or triethylphosphate. The most preferred sulfonation agent for this invention is a complex of $SO_3$ with triethylphosphate.

Neutralization of the acid form of the diblock or triblock polymer is done by the addition of a solution of a basic material to a solution of the unneutralized sulfonated diblock or triblock polymer. Suitable neutralizing agents are selected from metal hydroxides, metal acetates or metal alkoxides, wherein the metal cation is selected from the group consisting of iron, aluminum, lead, Groups IA, IIA, IB and IIB of the Periodic Table of Elements, wherein the sodium ion is preferred. The preferred neutralizing agent is an aqueous solution of sodium hydroxide or a solution of sodium methoxide in methanol.

The process for solubilizing a hydrocarbon into an aqueous solution comprises the steps of forming an aqueous solution of the diblock polymer of t-butylstyrene/metal styrene sulfonate or the triblock polymer of t-butylstyrene/metal styrene sulfonate/t-butylstyrene, wherein the concentration of the diblock or triblock polymer is about 0.005 to about 5 grams of the diblock or triblock polymers per 100 grams of water, wherein the aqueous solution has a viscosity of about 2 cP to about 5000 cP at room temperature, more preferably about 5 cP to about 1000 cP, and most preferably about 5 cP to about 500 cP; adding about 0.002 to about 1.0 grams of a hydrocarbon liquid to 100 grams of the aqueous solution of the diblock or triblock polymer, wherein the hydrocarbon liquid is selected from the group consisting of an aliphatic hydrocarbon having about 4 to about 12 carbon atoms, a cycloaliphatic hydrocarbon having about 5 to about 7 carbon atoms, an aromatic hydrocarbon having about 6 to about 20 carbon atoms, an aliphatic oil, a naphthenic oil and an aromatic oil; and stirring the oil and aqueous solution until a homogeneous solution has been obtained which has a viscosity of about 2 cP to about 5000 cP at room temperature.

DESCRIPTION OF THE PREFERRED EMBODIMENTS

The following examples illustrate the present invention without; however, limiting the same hereto.

EXAMPLE 1

Block Polymer Compositions

The block polymers of this invention contained sodium styrene sulfonate as the water/soluble block and t-butylstyrene as the water insoluble or hydrophobic block. The synthetic reaction sequence to the block polymer t-butylstyrene-styrene sulfonate began with the anionic polymerization of t-butylstyrene followed by the addition of styrene monomer to continue polymerization on the living anion polymer. All polymerizations were initiated with sec-butyl lithium to form the t-butylstyrene anion. Additional t-butylstyrene was added for the desired chain length of that block followed by the addition of styrene only for diblock polymer preparation. Chain termination was accomplished by the addition of an alcohol to the reaction mixture to protonate the chain and anionic functionality. The overall reaction sequence for the diblock polymer synthesis is presented in FIG. 1.

The preparation of triblock polymer with end blocks of t-butylstyrene was done sequentially, again, starting with initiation of t-butylstyrene polymerization by sec-butyl lithium. After addition of styrene to form the mid block, t-butylstyrene monomer was again added to the living polymer chain to complete the triblock polymer synthesis, as schematically presented in FIG. 2.

The sulfonation technique, shown in FIG. 3, for the preparation of all the water soluble sulfonate polymers utilized sulfur trioxide ($SO_3$) complexed with triethyl phosphate (TEP) as the sulfonation agent. The solvent medium was dichloroethane (DCE), chosen because the t-butylstyrene-styrene polymers were soluble, whereas the sulfonated polymers were insoluble in this solvent. The combination of solubility properties allowed for facile isolation of the desired sulfonated polymer that underwent little, if any, cross-linking. With more potent sulfonating agents, such as uncomplexed $SO_3$, cross-linking via sulfone functionality can be a serious consequence resulting in insoluble gel-like polymers. In the sulfonation of the block polymers, only the styrene block was sulfonated since the steric bulk of the t-butyl group effectively inhibited sulfonation of the substituted aromatic ring. Therefore, after neutralization of the styrene sulfonic acid block to the sodium salt, the polymers then consisted of a hydrophobic block, t-butylstyrene, and a hydrophilic block, sodium styrene sulfonate.

Two block polymers of styrene-t-butylstyrene were prepared. The compositional data for these polymers are presented in Table I. The diblock polymer at 11 wt. % t-butylstyrene—89 wt. % styrene had a weight average molecular weight of $4.7 \times 10^5$. The triblock polymer of composition 2.5 wt. % t-butylstyrene—95 wt. % styrene—2.5 wt. % t-butylstyrene had a weight average molecular weight approximately 20% higher than the diblock polymer at $6.1 \times 10^5$. Conversion of the above block copolymers into water soluble polymers was done via sulfonation of the styrene block, as described in P.M. 82-Cl-096.

EXAMPLE 2

Solution Viscometrics

To evaluate the rheological properties of aqueous solutions of these block polymers, the polymers were first dissolved in doubly distilled water at an initial concentration of 2500 ppm under mild agitation conditions (magnetic stirrer) at room temperature. Generally, dissolution of the polymer was complete after 24 hours of agitation. Solutions at lower polymer concentration were obtained by dilution of these concentrates with distilled water. To assess the influence of oil on the solution rheology, toluene was added directly to the solution of desired polymer concentration. An additional 24 hours of agitation was provided to insure system homogeneity.

Figure 4:
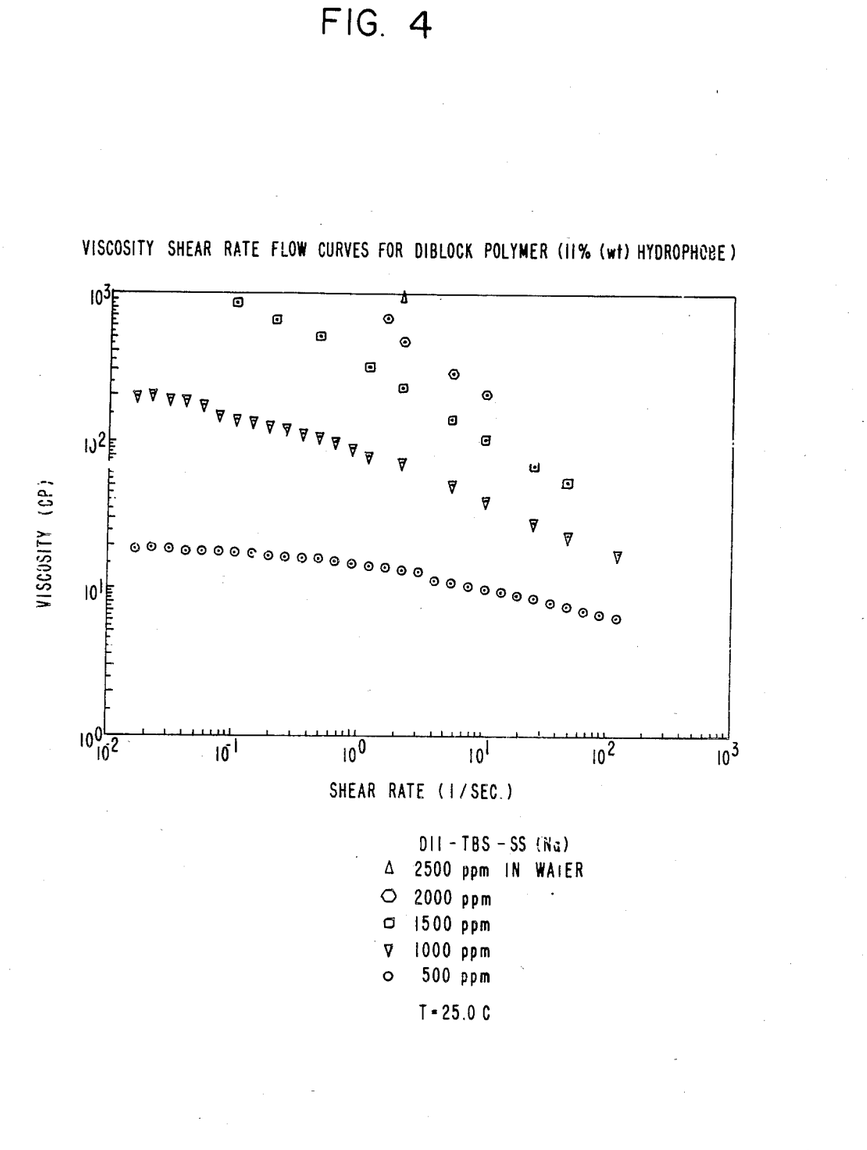
FIG. 4 illustrates a plot of viscosity versus shear rate for a sulfonated diblock polymer having 11 wt. % hydrophobe.

The rheology, in terms of viscosity-shear rate profile, was obtained using a Contraves LS-30 Couette viscometer. The shear rate range investigated was from 0.02 to 120 $sec^{-1}$. Due to the high viscosity of some solutions, the lower shear rates ($< 1\ sec^{-1}$) were not obtained due to shear stress limitations of the instrument. Since most of the samples exhibited pseudo-plastic behavior, it is important to determine viscosity as a function of shear rate in order to make valid comparisons between polymer structure and solution properties. FIG. 4 shows typical viscosity—Shear Rate behavior for a series of concentrations of D11-TBS-SS.

EXAMPLE 3

Effect of Toluene Addition on Solution Viscosity

A basis for studying hydrophobically associating block polymers involves the analogy with aqueous surfactant solutions. Above the CMC, surfactant solutions can solubilize hydrocarbons. To investigate the analogous phenomenon with block polymers, toluene was selected as the hydrocarbon to be added to the aqueous polymer solutions. This selection was based on good solubility of t-butylstyrene in aromatic hydrocarbon such as toluene.

Figure 5:
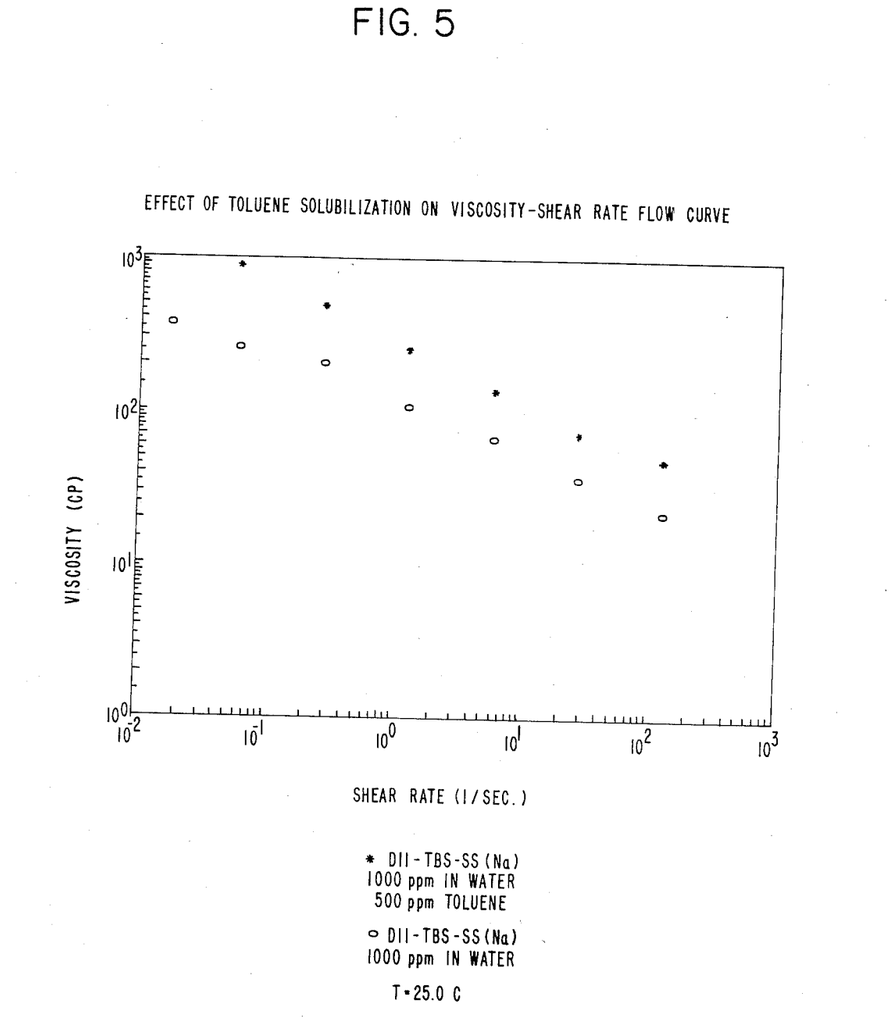
FIG. 5 illustrates a plot of viscosity versus shear rate for the effect of toluene solubilization.
Figure 6:
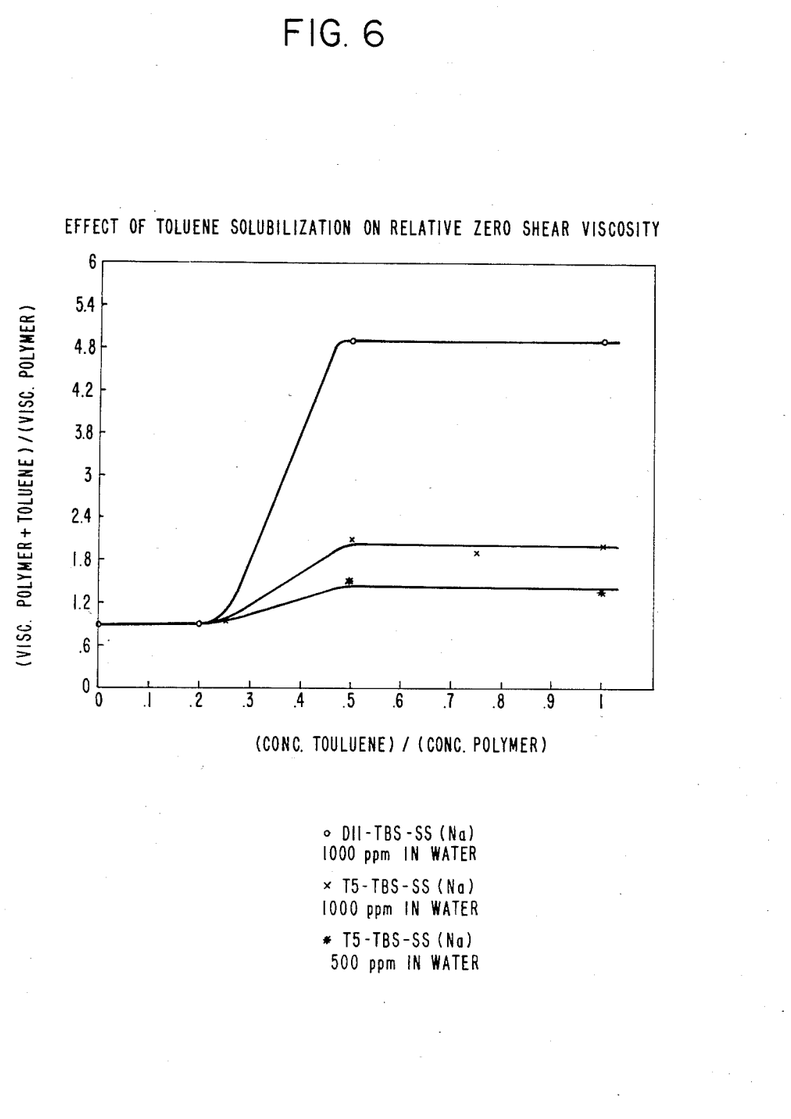
FIG. 6 illustrates a plot of viscosity versus shear rate for the effect of toluene solubilization on relative zero shear viscosity.

It was indeed observed that a 1000 ppm solution of the block polymer would incorporate up to 1000 ppm of toluene resulting in a homogeneous phase of increased viscosity. This viscosity increase, with added oil, is shown in FIG. 5 by the comparison of viscosity-shear rate plots of a 1000 ppm D11-TBS-SS solution with and without 500 ppm of toluene added. The effect of the level of toluene addition on the solution viscosity is shown in FIG. 6. This is a plot of the relative zero shear viscosity of a polymer solution with toluene to that without toluene as a function of the ratio of toluene to polymer. When this ratio is less than 0.2, toluene does not affect the solution viscosity. Between 0.2 and 0.5, the viscosity increases significantly. Beyond 0.5 viscosity, again, is unaffected. Two further points can be observed from the data in FIG. 6. First, in comparing a diblock and triblock polymer at the same polymer concentration, the relative viscosity increase is approximately the same as the ratio of hydrophobe chain lengths or hydrophobic concentration. Secondly, doubling the concentration (500 to 1000 ppm) of the triblock polymer with added toluene at saturation results in a 50% increase in the relative zero shear viscosity.

To confirm that, toluene uptake was associated with block polymer aggregation, similar experiments were attempted with the homopolymers. Under similar conditions of polymer and toluene concentrations, toluene solubilization was not observed. The toluene persisted as a second separate phase, and the viscosity of the polymer phase was not affected.

TABLE I t-Butylstyrene-Styrene Block Polymer Compositional Data

| Polymer | Block Composition wt. % (Mole %) | | | Molecular Weight[a] | | |
|---|---|---|---|---|---|---|
| | t-Butyl-styrene | Styrene | t-Butyl-styrene | $M_w \times 10^{-5}$ | $M_x \times 10^{-5}$ | $M_z \times 10^{-5}$ |
| D-11-TBS-S | 11(7.4) | 89 (92.6) | — | 4.7 | 4.4 | 4.9 |
| T-5-TBS-S | 2.5 (1.65) | 95 (96.7) | 2.5 (1.65) | 6.1 | 5.7 | 6.4 |

[a]Determined by gel permeation chromatographic techniques.

What is claimed is:
1. A process for the solubilization of a hydrocarbon liquid into an aqueous solution which comprises the steps of:
(a) forming said aqueous solution of water and a diblock polymer of t-butyl styrene/metal styrene sulfonate or a triblock polymer of t-butyl styrene/metal styrene sulfonated t-butylstyrene, said diblock polymer has the formula:

wherein m is about 0.5 to about 15.0 mole %, n is about 85.0 to about 99.5 mole %, and M is selected from the group consisting of hydrogen, and metals cations of iron, aluminum, lead, and Groups IA, IIA, IB and IIB of the Periodic Table of the Elements and having a molecular weight of about 100,000 to 3,000,000, said formula -continued wherein m is about 0.5 to about 15.0 mole %, n is about 85.0 t about 99.5 mole %, and M is selected from the group consisting of hydrogen, and metals cations of iron, aluminum, lead, and Groups IA, IIA, IB and IIB of the Periodic Table of Elements, and having a molecular weight of about 100,000 to 3,000,000, the concentration of said diblock or triblock polymer in said aqueous solution being about 0.005 to 5 grams of said diblock or triblock polymer per 100 grams of said water;

(b) adding about 0.002 to about 1.0 gram of a hydrocarbon liquid to 100 grams of said aqueous solution of said diblock or triblock polymer, said hydrocarbon liquid being selected from the group consisting of an aliphatic hydrocarbon having about 5 to about 7 carbon atoms, a cycloaliphatic hydrocarbon having about 5 to about 7 carbon atoms, an aromatic hydrocarbon having about 6 to about 20 carbon atoms, an aliphatic oil, a naphthenic oil and an aromatic oil; and (c) stirring said hydrocarbon liquid and said aqueous solution of said diblock polymer of said triblock polymer until a homogeneous solution has been obtained.

2. A process according to claim 1, wherein said M is sodium.

3. A process according to claim 1 wherein said hydrocarbon liquid is an aliphatic, naphthenic or aromatic oil.

* * * * *